(12) United States Patent
Wade

(10) Patent No.: US 12,181,358 B2
(45) Date of Patent: Dec. 31, 2024

(54) PRE-FORMED SOLID AS COUPLING MECHANISM IN MEDIA-ISOLATED PRESSURE SENSORS

(71) Applicant: Honeywell International Inc., Charlotte, NC (US)

(72) Inventor: Richard Andrew Wade, Worthington, OH (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 263 days.

(21) Appl. No.: 17/806,911

(22) Filed: Jun. 14, 2022

(65) Prior Publication Data

US 2023/0400373 A1    Dec. 14, 2023

(51) Int. Cl.
G01L 19/06    (2006.01)
G01L 9/00     (2006.01)

(52) U.S. Cl.
CPC ........ *G01L 19/0645* (2013.01); *G01L 9/0052* (2013.01)

(58) Field of Classification Search
None
See application file for complete search history.

(56) References Cited

U.S. PATENT DOCUMENTS 5,581,038 A     12/1996  Lampropoulos et al.
6,684,710 B2 *   2/2004  Chevallet .......... A61M 1/36224
                                                    73/723
6,820,490 B2 *  11/2004  Mittelstein .......... G01L 19/0023
                                                    73/715
10,571,348 B2    2/2020  Wade et al.
10,732,057 B2    8/2020  Fribley et al.
(Continued)

FOREIGN PATENT DOCUMENTS

CN     108168741 A  *  6/2018
EP       2474819 A1     7/2012
(Continued)

OTHER PUBLICATIONS

Extended European Search Report Mailed on Nov. 7, 2023 for EP Application No. 23176448, 10 page(s).
(Continued)

*Primary Examiner* — Peter J Macchiarolo
*Assistant Examiner* — Jermaine L Jenkins
(74) *Attorney, Agent, or Firm* — Alston & Bird LLP

(57) ABSTRACT

A media-isolated pressure and force sensor is provided utilizing a deformable solid as a coupling mechanism for transmitting a received external pressure to the surface of a pressure sensing diaphragm. An example media-isolated pressure and force sensor may include a pressure sensing diaphragm that is coupled to a substrate of the media-isolated pressure sensor and a deformable solid. The deformable solid may be configured to deform so as to substantially cover a sensing surface of the pressure sensing diaphragm to create a barrier between the pressure sensing diaphragm and a measured media. In addition, the deformable solid may fluidly couple the measured media to the pressure sensing diaphragm such that in an instance in which a force is applied to the deformable solid by the measured media the force is transmitted to the pressure sensing diaphragm.

18 Claims, 4 Drawing Sheets

(56) References Cited

U.S. PATENT DOCUMENTS

| | | | |
|---|---|---|---|
| 11,630,011 B2* | 4/2023 | Huntzinger | G01L 19/0038 73/727 |
| 11,788,913 B2* | 10/2023 | Gabrielle | G01L 19/0084 73/724 |
| 2017/0241852 A1 | 8/2017 | Wade | |
| 2018/0306660 A1 | 10/2018 | Wade et al. | |
| 2023/0160514 A1* | 5/2023 | Mbaye | G01L 19/0038 73/756 |

FOREIGN PATENT DOCUMENTS

| | | |
|---|---|---|
| EP | 3205997 A1 | 8/2017 |
| EP | 3754318 A1 | 12/2020 |

OTHER PUBLICATIONS

"Media Isolated Pressure Sensors: Digital, Millivolt, Analog," TE Connectivity, 7 pages, (2022). [Retrieved from the Internet Nov. 12, 2022: <URL:https://www.te.com/usa-en/products/sensors/pressure-sensors/media-isolated-pressure-sensors.html?tab=pgp-story>].

English Translation of JP Office Action dated Jun. 6, 2024 for JP Application No. 2023094117, 2 page(s).

JP Office Action Mailed on Jun. 6, 2024 for JP Application No. 2023094117, 4 page(s).

* cited by examiner

PRE-FORMED SOLID AS COUPLING MECHANISM IN MEDIA-ISOLATED PRESSURE SENSORS

TECHNOLOGICAL FIELD

Embodiments of the present disclosure relate generally to pressure and force sensors, and more particularly, to media-isolated pressure and/or force sensors.

BACKGROUND

Applicant has identified many technical challenges and difficulties associated with coupling mechanisms in media-isolated pressure and force sensors. Through applied effort, ingenuity, and innovation, Applicant has solved problems related to coupling mechanisms in media-isolated pressure and force sensors by developing solutions embodied in the present disclosure, which are described in detail below.

BRIEF SUMMARY

Various embodiments are directed to an example mechanism for easily and reliably coupling external pressure and/or force from a measured media to pressure sensing circuitry of a media-isolated pressure sensor.

In accordance with some embodiments of the present disclosure, an example media-isolated pressure sensor is provided utilizing a deformable solid as a coupling device. In some embodiments, the media-isolated pressure sensor may comprise a pressure sensing diaphragm that is coupled to a substrate of the media-isolated pressure sensor and a deformable solid. The deformable solid may be configured to deform so as to substantially cover a sensing surface of the pressure sensing diaphragm to create a barrier between the pressure sensing diaphragm and a measured media. In addition, the deformable solid may fluidly couple the measured media to the pressure sensing diaphragm such that in an instance in which a force is applied to the deformable solid by the measured media the force is transmitted to the pressure sensing diaphragm.

In some embodiments, the media-isolated pressure sensor may further comprise, a pressure sensing die electrically connected to the pressure sensing diaphragm.

In some embodiments, the pressure sensing diaphragm may be disposed on the pressure sensing die opposite the substrate.

In some embodiments, the media-isolated pressure sensor may further comprise a ring seal assembly protruding from the substrate and defining a pressure sensing cavity, wherein, the ring seal assembly forms an enclosed perimeter around the pressure sensing die, and wherein the ring seal assembly extends from the substrate beyond the furthest extent of the pressure sensing diaphragm.

In some embodiments, the pressure sensing die may indicate a magnitude of the force applied by the measured media based on the deflection of the pressure sensing diaphragm.

In some embodiments, the pressure sensing diaphragm may further comprise piezoresistive sensors arranged in a Wheatstone bridge circuit and the magnitude of the force applied by the measured media may be determined based on the one or more output signals of the Wheatstone bridge circuit.

In some embodiments, the deformable solid may further deform to substantially fill the pressure sensing cavity.

In some embodiments, the pressure sensing diaphragm may be fluidly isolated from the measured media.

In some embodiments, the ring seal assembly may comprise an inner perimeter and an outer perimeter, wherein the inner perimeter is circular.

In some embodiments, the maximum cross-sectional diameter of the deformable solid may be greater than or equal to the diameter of the inner perimeter of the ring seal assembly.

In some embodiments, the deformable solid may be manufactured free of defects which change the fluid coupling properties over time.

In some embodiments, the measured media may be a fluid.

Another example media-isolated pressure sensor utilizing a deformable solid as a coupling device is further included. In some embodiments, the example media-isolated pressure sensor may comprise pressure sensing circuitry that is attached to a substrate of the media-isolated pressure sensor and comprising a pressure sensing diaphragm disposed on a pressure sensing die. In addition, the media-isolated pressure sensor may comprise a ring seal assembly protruding from the substrate and defining a pressure sensing cavity, wherein the ring seal assembly extends from the substrate beyond the furthest extent of the pressure sensing diaphragm and forms an enclosed perimeter around the pressure sensing die. Further, the media-isolated pressure sensor may comprise a coupling mechanism comprising a deformable solid that deforms to cover a sensing surface of the pressure sensing diaphragm, wherein the deformable solid fluidly couples the measured media to the pressure sensing diaphragm such that in an instance when a force is applied to the deformable solid by a measured media the force is transmitted to the pressure sensing diaphragm.

In some embodiments, the media-isolated pressure sensor may further comprise a vent in the substrate, fluidly connecting the pressure sensing cavity with an environment opposite the surface of the pressure sensing cavity.

In some embodiments, the substrate may be a printed circuit board.

In some embodiments, the pressure sensing die may be electrically connected to the printed circuit board using one or more through-hole connections.

In some embodiments, at least one of the one or more through-hole connections may fluidly connect the pressure sensing cavity with an environment opposite the substrate of the pressure sensing cavity.

In some embodiments, the pressure sensing die may indicate a magnitude of the force applied by the measured media based at least in part on the deflection of the pressure sensing diaphragm.

In some embodiments, the pressure sensing diaphragm may further comprise piezoresistive sensors arranged in a Wheatstone bridge circuit and the magnitude of the force applied by the measured media may be determined based on the one or more output signals of the Wheatstone bridge circuit.

An example coupling mechanism for a media-isolated pressure sensor is further included. In some embodiments, the coupling mechanism may comprise a deformable solid, wherein the deformable solid is configured to deform so as to substantially cover a sensing surface of a pressure sensing diaphragm so as to create a barrier between the pressure sensing diaphragm and a measured media. In addition, the deformable solid may fluidly couple the measured media to the pressure sensing diaphragm such that in an instance in which a force is applied to the deformable solid by the measured media the force is transmitted to the pressure sensing diaphragm.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
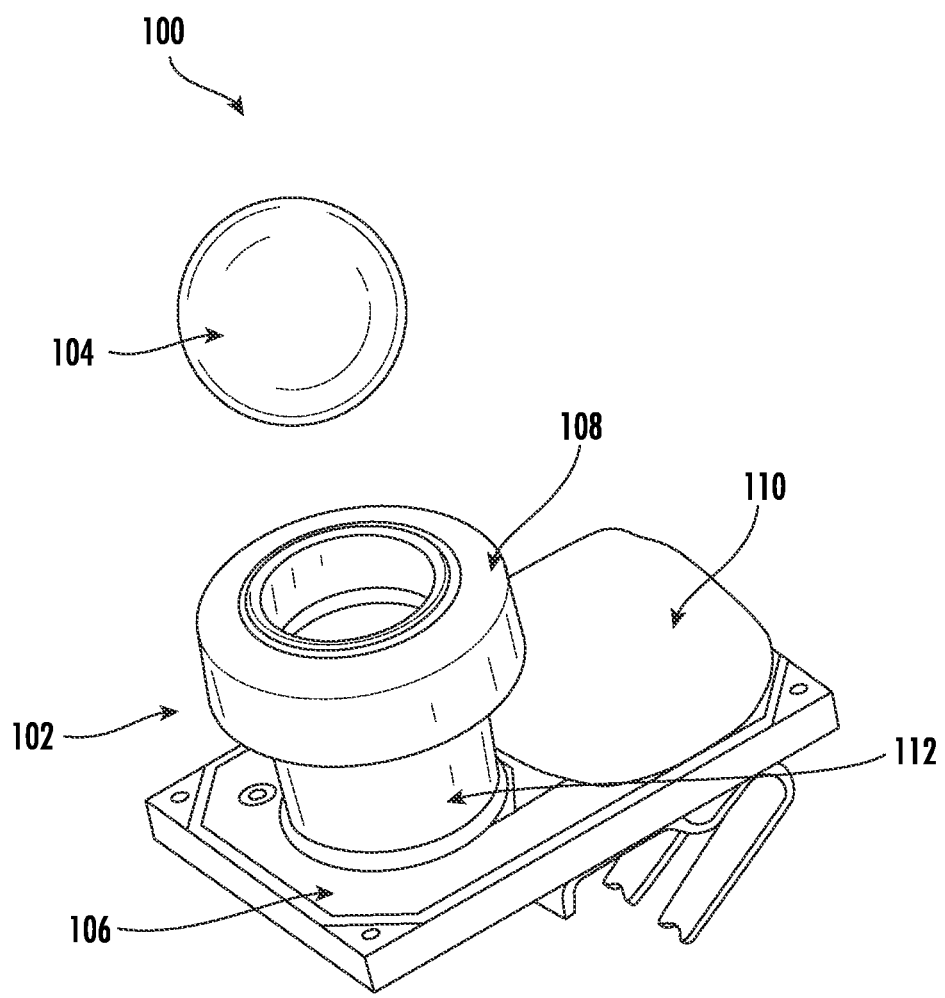
FIG. 1 illustrates a perspective view of an example media-isolated pressure sensor and a deformable solid in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with coupling an external pressure or force from a measured media with the pressure sensing circuitry in a media-isolated pressure sensor. As understood by those of skill in the field to which the present disclosure pertains, there are numerous scenarios in which pressure and/or force may be measured while maintaining isolation between the pressure sensing circuitry (e.g., pressure sensing die) and the measured media (e.g., fluid) producing a pressure. For example, medical staff may need to measure a patient's blood pressure through an intravenous line. In such a scenario, it is important that the pressure sensing die and other circuitry remain isolated from the patient's bodily fluid and from the incoming intravenous fluid to remain in compliance with medical standards. In addition, demand is high for media-isolated pressure sensors suitable for measuring pressure in a fluid media that can be manufactured at a low cost. As such, a low-cost mechanism is needed to transmit the pressure of the measured media (e.g., bodily fluid) to the pressure sensing die, while maintaining a barrier between the bodily fluid and the pressure sensing die.

Current coupling mechanisms suffer from a number of deficiencies. For example, pressure sensors produced using gel as a coupling device are time consuming to manufacture and flaws in the manufacturing process can often lead to inaccuracies in pressure readings. These gel-based coupling devices require a time-consuming process to ensure that no pockets of air or other irregularities exist in the gel before a calibration is performed. To allow sufficient time to remove all irregularities from the gel, substances must be added to the gel to prevent the gel from curing too quickly. Once the irregularities have been removed and the gel is in place, the gel may need to be manually cured before calibration. In some instances, the inhibitors to the curing process may continue to operate after a manual cure and calibration has occurred, causing the transmission properties of the gel to change over time and the pressure reading output to change over time. In addition, other media-isolated pressure sensors utilize rigid devices as a coupling mechanism which contact the pressure sensing diaphragm over a small surface area. These rigid coupling mechanisms often cause the pressure sensing diaphragm to bow under pressure, once again creating inaccuracies in the pressure reading output. Finally, some media isolated sensors utilize a sealed liquid or oil to act as a coupling mechanism. These devices can be prohibitively expensive to manufacture for many of the desired applications.

The various example embodiments described herein utilize various techniques to provide consistent pressure readings after calibration and reduce the cost of manufacturing of media-isolated pressure sensors. For example, in some embodiments, a deformable solid or plug may be used as a coupling device. The example deformable solid may be manufactured such that it is free of air bubbles and other irregularities that may cause a shift or change in the pressure readings over time. Further, utilizing the deformable solid removes, in some examples, the need to cure the coupling mechanism, further simplifying the manufacturing process and reducing the risk of changing coupling properties. In addition, the deformable solid may deform to contact the full surface of the pressure sensing diaphragm, leading to an even distribution of transmitted pressure across the diaphragm's surface. Such uniform contact with the sensing surface of the diaphragm leads to an output voltage that changes linearly with the applied pressure, providing a closer representation of the media applied pressure than when the coupling force is concentrated in a narrow area of the diaphragm's surface. Finally, the malleability of the deformable solid as a coupling mechanism enables the silicone or other material to substantially fill the ring seal assembly and isolate the measured media from the pressure sensing diaphragm and other pressure sensing circuitry.

As a result of the herein described example embodiments, the simplicity in manufacturing media-isolated pressure sensors may be greatly improved. In addition, the media-isolated pressure sensors utilizing a deformable solid as a coupling device may maintain greater accuracy over time.

Figure 2:
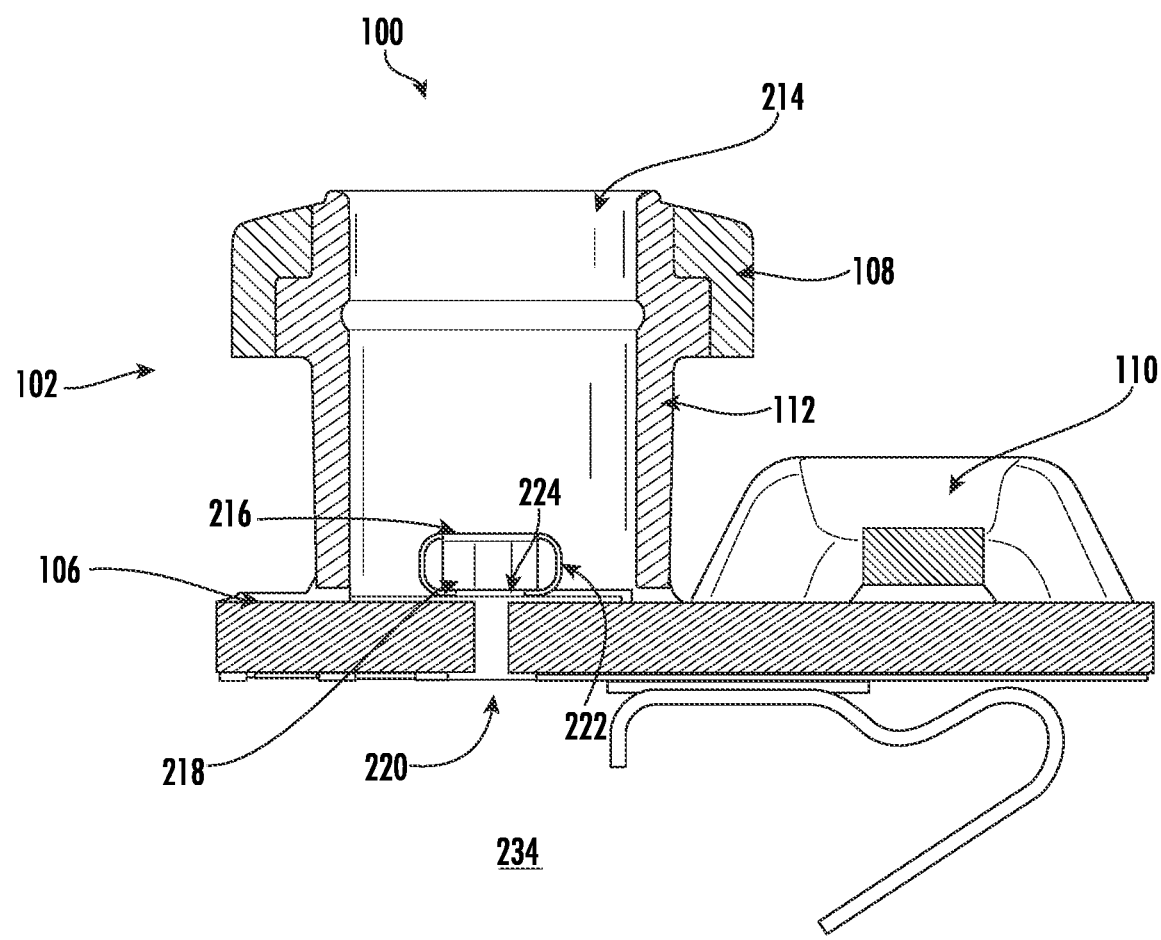
FIG. 2 illustrates a cross-section view of an example media-isolated pressure sensor in accordance with an example embodiment of the present disclosure.
Figure 3:
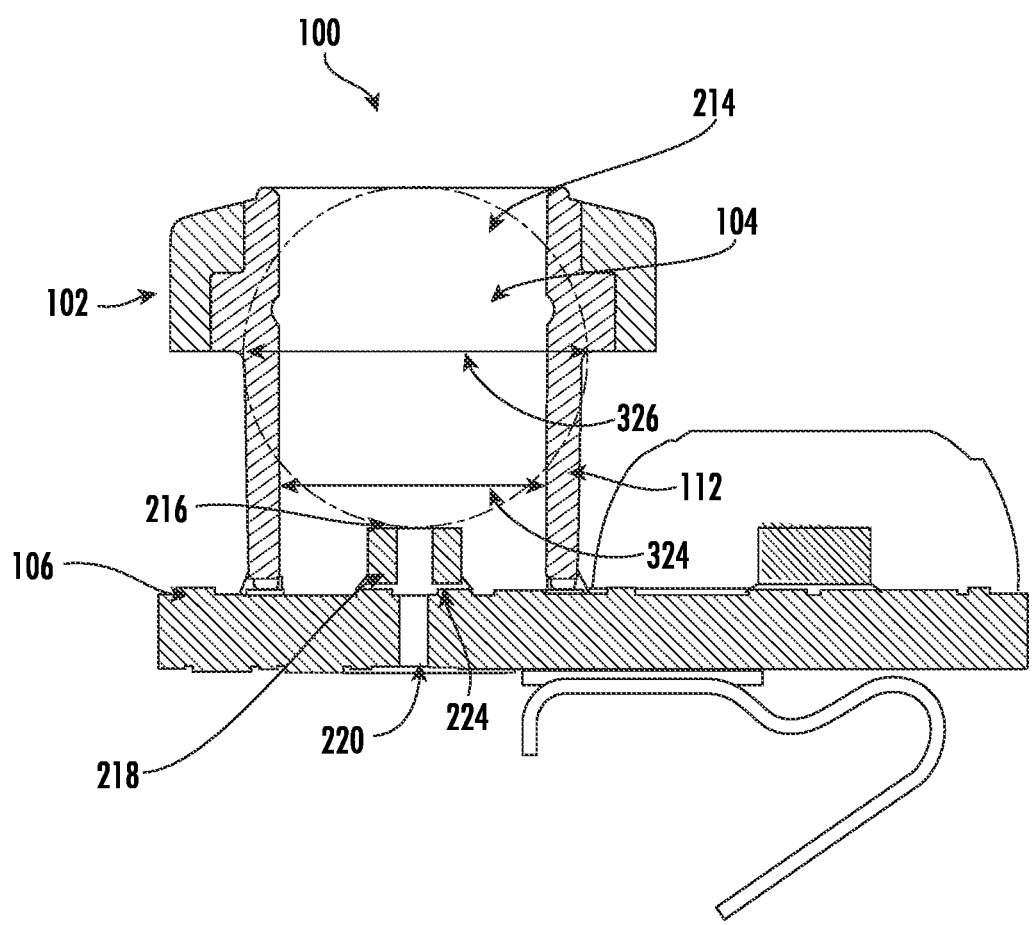
FIG. 3 illustrates a cross-section view of an example deformable solid overlaid on a cross-section view of an example media-isolated pressure sensor in accordance with an example embodiment of the present disclosure.
Figure 4:
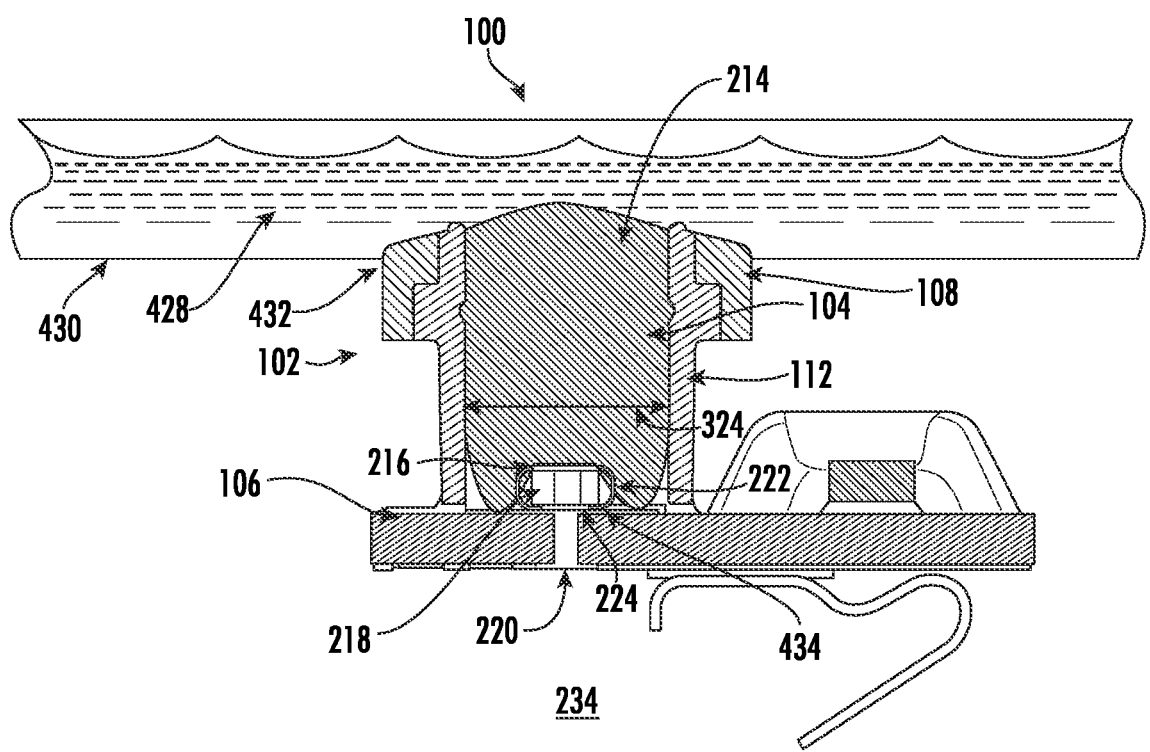
FIG. 4 illustrates a cross-section view of an example media-isolated pressure sensor positioned to determine a pressure reading associated with a measured media in accordance with an example embodiment of the present disclosure.

FIG. 1 illustrates a perspective view of an example media-isolated pressure sensor 100 and a deformable solid 104. As depicted in the example embodiment of FIG. 1, the media-isolated pressure sensor 100 includes a ring seal assembly 102 attached to a substrate (e.g., a printed circuit board (PCB) 106). The depicted ring seal assembly 102 forms a ring structure protruding from the surface of the substrate (e.g., PCB 106) and further includes a sealing structure 108 surrounding an outer surface at or near the upper portion of the ring seal assembly 102 for creating a seal between the ring seal assembly 102 and a fluid conduit 430 (as shown in FIG. 4). The depicted media-isolated pressure sensor 100 further includes a deformable solid 104 that once inserted into the interior of the ring seal assembly 102, substantially fills the volume of the ring seal assembly 102 and creates a coupling mechanism between the measured media and the pressure sensing circuitry (as shown in FIGS. 2-4). The example media-isolated pressure sensor 100 of FIG. 1 further depicts processing elements 110 disposed on the PCB 106 and communicatively connected to the pressure sensing circuitry of the media-isolated pressure sensor 100.

As illustrated in FIG. 1, the ring seal assembly 102 may be a part of a media-isolated pressure sensor 100 as described herein. The ring seal assembly 102 as illustrated in FIG. 1 comprises at least one ring seal sidewall 112 and a sealing structure 108 surrounding an outer surface of the at least one ring seal sidewall 112 for creating a seal between the media-isolated pressure sensor 100 and a fluid conduit (e.g., fluid conduit 430 containing a fluid for pressure measurement thereof). The at least one ring seal sidewall 112 defines an at least substantially smooth interior surface of the ring seal assembly 102 surrounding an interior of the at least one ring seal sidewall 112, and an at least substantially smooth exterior surface of the ring seal assembly 102 surrounding an exterior of the ring seal assembly 102. When configured as a portion of a pressure sensor, the ring seal assembly 102 structure is configured for enclosing the pressure sensing elements within the interior of the ring seal assembly 102, surrounded by the at least one ring seal sidewall 112. As shown in FIG. 1, the ring seal assembly 102 may have a circular tubular shape (characterized by a diameter and a length), although other configurations may be suitable for certain implementations. For example, the ring seal assembly 102 may have a rectangular cross-section (having four ring seal sidewalls 112), a triangular cross-section (having three ring seal sidewalls 112), a hexagonal cross-section (having six ring seal sidewalls 112), and/or the like.

The sidewalls of the ring seal assembly 102 may comprise a molded plastic material (e.g., Polysulfone, Polycarbonate, Acrylic, Stainless Steel, etc.), however it should be understood that other materials such as Teflon, glass, etc. may be used in certain embodiments. Embodying the at least one ring seal sidewall 112 of the ring seal assembly 102 as a molded plastic ring has the advantage of a low material cost and ease of manufacturing.

As further illustrated in FIG. 1, the deformable solid 104 may be a part of the media-isolated pressure sensor 100 as described herein. The deformable solid 104 as illustrated in FIG. 1 is an intact volume of incompressible material shaped to substantially match the cross-sectional shape of the interior surface of the ring seal assembly 102. The deformable solid 104 may be positioned in the hollow interior of the ring seal assembly 102 as an incompressible fluid to provide a fluid coupling mechanism between a measured media and the pressure sensing circuitry as further described in relation to FIG. 4. The deformable solid 104 may be pre-manufactured such that all or substantially all air pockets and/or other irregularities are removed from the body of the material. As shown in FIG. 1, the deformable solid 104 may have a spherical shape, although other configurations may be suitable for certain implementations. For example, the deformable solid 104 may have a cylindrical shape, spheroid shape, a triangular prism shape, a cubic or cuboid shape, a hexagonal prism shape, and/or the like. The coupling mechanism embodied by deformable solid 104 may be comprised of any incompressible fluid material capable of providing fluid coupling between the measured media and the pressure sensing circuitry, for example, silicone. In addition, the coupling mechanism embodied by deformable solid 104 may have the capability to deform to fit the shape defined by the interior of the ring seal assembly 102 such that the measured media is isolated from the pressure sensing circuitry. Embodying the coupling mechanism as a pre-manufactured, intact body has the advantage of simple assembly, as the deformable solid 104 does not require a process to remove unwanted pockets of air and subsequent curing time. In addition, a media-isolated pressure sensor 100 utilizing a deformable solid 104 as a coupling mechanism provides more consistent pressure readings after calibration is performed as the properties of the deformable solid 104 do not change over time due to a prolonged curing process and the deformable solid 104 applies and evenly distributed pressure across the surface of the pressure sensing circuitry.

FIG. 2 illustrates a cross-section view of an example media-isolated pressure sensor 100. As depicted in the example embodiment of FIG. 2, the media-isolated pressure sensor 100 includes a ring seal assembly 102 attached to a PCB 106 and defining at least one ring seal sidewall 112. The inner wall of the ring seal sidewall 112 defines a perimeter that surrounds the pressure sensing circuitry (e.g., the pressure sensing diaphragm 216 and the pressure sensing die 218). The pressure sensing die 218 is attached to the PCB 106 on one end while the pressure sensing diaphragm 216 is disposed on the opposite end. In addition, a through-hole conduit 220 defines an opening through the PCB 106, allowing the reference pressure of the environment 234 to interact with the bottom surface of the pressure sensing diaphragm 216. FIG. 2 further depicts a passage 224 through the wall of the pressure sensing die 218, allowing the pressure sensing diaphragm to electrically connect to the PCB 106 in a protected manner. The through-hole conduit 220, in combination with the passage 224, also provides fluid communication between the pressure sensing cavity 214 and the environment 234 on the opposite side of the PCB 106 when the opening to the pressure sensing cavity 214 defined by the ring seal assembly 102 is plugged by the coupling device. Further, the processing elements 110 are communicatively connected to the pressure sensing die 218 via defined electrical connections on the PCB 106.

As illustrated in FIG. 2, a pressure sensing die 218 may be a part of an example media-isolated pressure sensor 100 as described herein. The pressure sensing die 218 as depicted in FIG. 2, comprises a semiconductor material including at least one sidewall protruding from the surface of the PCB 106 and forming a perimeter around an interior opening. As shown in FIG. 2, the pressure sensing die 218 may define a rectangular cross-section perimeter (characterized by a length and a width) with an opening in the center, however, other solutions may be suitable for certain implementations, for example a pressure sensing die 218 having one sidewall forming a circular cross-section perimeter. The pressure sensing die 218 shown is attached to the PCB 106 on one end, while the distil end protrudes into the pressure sensing cavity, defining a space interior to the perimeter formed by the pressure sensing die 218.

The pressure sensing diaphragm 216, also depicted in FIG. 2, is formed such that the shape of the pressure sensing diaphragm 216 allows the pressure sensing diaphragm 216 to rest atop the pressure sensing die 218. In some embodiments, the top surface of the pressure sensing die 218 may be etched to form a recessed feature allowing the pressure sensing diaphragm 216 to securely sit within the bounds of the etched feature. The pressure sensing diaphragm 216 as depicted is formed of a semiconductor material. The pressure sensing diaphragm 216 may contain piezoresistive sensors arranged in a Wheatstone bridge circuit, such that pressure on and deflection of the pressure sensing diaphragm 216 creates a change in resistance in the disposed sensors and a voltage output correlated to the applied force. In the depicted example, the pressure sensing diaphragm 216 is disposed atop the at least one sidewall such that a substantial portion of the pressure sensing diaphragm 216 is suspended over the interior space created by the pressure sensing die 218. Placing the pressure sensing diaphragm 216 over the opening allows the pressure sensing diaphragm 216 to deflect in a manner, such that the change in the electrical properties of the pressure sensing diaphragm 216 are representative of the applied pressure. The pressure sensing die 218 further acts to elevate the pressure sensing diaphragm 216 above the surface of the PCB 106, isolating the pressure sensing die 218 from other pressures or vibrations that may disturb the pressure readings. The pressure sensing diaphragm electrically connects to the PCB 106 via through-hold connectors 222 passing through the passage 224 in the pressure sensing die 218, such that output signals resulting from applied pressure to the pressure sensing diaphragm 216 are transmitted from the pressure sensing die 218 and through connections made on the PCB 106 to the processing elements 110 to determine a pressure reading. By passing the through-hole connectors 222 through the passage 224 to the PCB 106, and making the electrical connections outside of the pressure sensing cavity 214, the electrical connections and soldered components of the pressure sensing die 218 may be protected from damage or shorts due to the inserted deformable solid 104. In addition, the through-hole conduit 220 provides a fluid connection between the pressure sensing cavity 214 and the environment 234 outside the pressure sensing cavity 214. Such a configuration allows air to escape through the through-hole conduit 220 when the deformable solid 104 is inserted into the pressure sensing cavity 214, preventing the creation of trapped air pockets.

As further illustrated in FIG. 2, the example media-isolated pressure sensor 100 may also include a through-hole conduit 220. As shown in FIG. 2, a through-hole conduit 220 defines an opening in the substrate (e.g., PCB 106) allowing the reference pressure of the environment 234 to interact with the bottom surface of the sensing die 218 to electrically connect to the PCB 106 on the surface opposite the pressure sensing die 218 using through-hole connectors 222. As shown in FIG. 2, the pressure sensing die 218 may be centered such that the interior opening of the pressure sensing die 218 aligns with the through-hole conduit 220, facilitating the interaction of the reference pressure from environment 234 with the bottom of the pressure sensing diaphragm. In some embodiments, the pressure sensing die 218 may be mounted to allow fluid connectivity from within the pressure sensing cavity 214 and into the through-hole conduit 220.

As further illustrated in FIG. 2, the example media-isolated pressure sensor 100 may also include processing elements 110. In some embodiments, the processing elements 110 may be configured to receive the output signals from the pressure sensing die 218 and convert the output signal into a pressure reading. In some embodiments, the processing elements 110 may output the pressure reading in analog format while in other embodiments, the processing elements 110 may output the pressure reading in a digital format. The processing elements 110 may further be utilized to calibrate and balance the piezoresistive sensors prior to distribution of the example media-isolated pressure sensor 100. In some embodiments, the processing elements 110 may comprise a processor, specially configured field programmable gate array (FPGA), specially programmed application specific integrated circuit (ASIC), trimmable film resistor network, or other similar computing device. Subsequent pressure readings may be determined based on this calibration.

FIG. 3 illustrates a cross-section view of an example deformable solid 104 overlaid on a cross-section view of an example media-isolated pressure sensor 100. As depicted in the example embodiment of FIG. 3, the maximum cross-section diameter 326 of the deformable solid 104 is greater than the diameter of the inner perimeter 324 of the pressure sensing cavity 214.

Referring to FIG. 3, an example media-isolated pressure sensor 100 depicts an example relative size of the deformable solid 104 as compared to the ring seal assembly 102. As shown in the depicted embodiment, the maximum cross-section diameter 326 of the deformable solid 104 is greater than the diameter of the inner perimeter 324 of the ring seal assembly 102. While the depicted deformable solid 104 defines a maximum cross-section diameter 326 greater than the diameter of the inner perimeter 324 of the pressure sensing cavity 214, in some embodiments the maximum cross-section diameter 326 of the deformable solid 104 may be equal to or less than the diameter of the inner perimeter 324 of the pressure sensing cavity 214. In an instance in which the maximum cross-section diameter 326 of the deformable solid 104 is less than the diameter of the inner perimeter 324 of the pressure sensing cavity 214, the deformable solid 104 must have sufficient volume such that when the deformable solid 104 is forced into the pressure sensing cavity 214, the deformable solid 104 deforms to plug the entire cross-sectional area of the pressure sensing cavity 214 such that the deformable solid 104 fluidly isolates the pressure sensing circuitry from the measured media. In other words, no fluid from the measured media may penetrate the barrier created by the deformable solid 104 between the measured media and the pressure sensing circuitry. In some embodiments, the maximum cross-section diameter 326 of the deformable solid 104 may be between 1 and 5 millimeters, more preferably between 1.5 and 3.3 millimeters, most preferably between 2 and 2.8 millimeters. In some embodiments, the diameter of the inner perimeter 324 of the pressure sensing cavity 214 may be between 1 and 4 millimeters, more preferably between 1.5 and 3 millimeters, most preferably between 1.75 and 2.25 millimeters. The typical durometer of a deformable solid 104 may be between 0 and 20 on a Shore 00 scale, more preferably below 15 on a Shore 00 scale, and most preferably below 10 on a Shore 00 scale. Although, higher durometer materials may be used if the shape of the deformable solid 104 substantially matches the volume of the pressure sensing cavity 214.

FIG. 4 illustrates a cross-section view of an example media-isolated pressure sensor 100 positioned to determine a pressure reading associated with a fluid 428 in accordance with an example embodiment of the present disclosure. As depicted in the example embodiment of FIG. 4, a sealing structure 108 encircles the exterior surface proximate the upper end of the ring seal assembly 102. The upper end of the ring seal assembly 102 is inserted into an opening in a fluid conduit 430 carrying a measured media (e.g., fluid 428). The sealing structure 108 creates a seal between the opening 432 in the fluid conduit 430 and the media-isolated pressure sensor 100 such that the fluid 428 remains in the fluid conduit 430 and interacts with the deformable solid 104 positioned in the pressure sensing cavity 214 of the ring seal assembly 102.

As depicted in FIG. 4, a media-isolated pressure sensor 100 may be inserted into an opening 432 of a fluid conduit 430 to determine the pressure of a contained measured media (e.g., fluid 428). While the conduit from which pressure is being measured in FIG. 4 is a fluid conduit 430, the pressure of a measured media may be measured in any conduit, tube, cavity, enclosure, or other space. As illustrated in FIG. 4, in some embodiments, a fluid conduit 430 may contain an opening 432 substantially identical to the dimensions of the sealing structure 108 such that a fluid-tight seal is created between the opening 432 and the upper portion of the ring seal assembly 102 preventing undesired fluid leakage around the exterior of the sealing structure 108. Non-limiting examples of a fluid conduit 430 include an intravenous line, catheter, a fluid container, and/or the like.

As further depicted in FIG. 4, an example media-isolated pressure sensor 100 may include a sealing structure 108 encircling an exterior surface of the at least one ring seal sidewall 112 of the ring seal assembly 102 proximate an upper end of the ring seal assembly 102 (e.g., closer to the upper end of the ring seal assembly 102 than a opposite lower end of the ring seal assembly 102) and forming a protruding barrier between the upper end of the ring seal assembly 102 and the lower end of the ring seal assembly 102. In certain embodiments, the sealing structure 108 comprises a resilient material configured to form a fluid seal with an at least substantially smooth surface of a fluid conduit 430. For example, the sealing structure 108 may comprise rubber, silicone, or other resilient polymer material. In some embodiments, the ring seal assembly 102 may couple directly to the fluid conduit 430 without the aid of a sealing structure 108.

FIG. 4 further depicts a deformable solid 104 inserted into the pressure sensing cavity 214 of the ring seal assembly 102 and deformed to substantially fill the pressure sensing cavity 214. As described in relation to FIG. 3, due to the deformable and incompressible nature of the deformable solid 104, applying force to insert the deformable solid 104 into the pressure sensing cavity 214 may cause deformation of the deformable solid 104, such that the volume of the deformable solid 104 substantially fills the pressure sensing cavity 214. In addition to substantially filling the pressure sensing cavity 214, FIG. 4 further depicts the deformable solid 104 deforming to create a barrier between the pressure sensing circuitry and the measured media (e.g., fluid 428). Further, as the deformable solid 104 is forced into the pressure sensing cavity 214 formed by the ring seal assembly 102 and against the pressure sensing diaphragm 216, the deformable solid 104 deforms to substantially cover the sensing surface of the pressure sensing diaphragm 216. By deforming the coupling mechanism (e.g. the deformable solid 104) to substantially cover the sensing surface of the pressure sensing diaphragm 216, the pressure from the measured media (e.g., fluid 428) may be transmitted evenly across the sensing surface of the pressure sensing diaphragm 216. Even transmission across the entire sensing surface of the pressure sensing diaphragm 216 provides uniform stretching of the pressure sensing diaphragm 216 generating output voltages that change linearly with the media applied pressure and providing a closer representation of the media applied pressure than when the coupling force is concentrated in a narrow area of the diaphragm's surface. Further, by substantially filling the pressure sensing cavity 214, the deformable solid 104 fluidly couples the measured media (e.g., fluid 428) to the pressure sensing circuitry (e.g., pressure sensing diaphragm 216 and pressure sensing die 218), in other words, the deformable solid 104 provides a fluid pressure-transmitting media, transmitting a received external pressure to the surface of the pressure sensing diaphragm 216.

FIG. 4 further depicts a cavity vent 434, allowing the escape of air and other fluids and/or gasses from the pressure sensing cavity 214 through the PCB 106 and into the environment 234 opposite the PCB 106 from the ring seal assembly 102. In some embodiments, at the location where the pressure sensing die 218 is attached to the substrate (e.g., the PCB 106), the attaching mechanism may define gaps (e.g. cavity vent 434) between the bottom surface of the pressure sensing die 218 and the surface of the substrate. Such a gap may provide a cavity vent 434 from the pressure sensing cavity 214, through the defined gaps, through the through-hole conduit 220, and to the environment 234 opposite the PCB 106. By defining a cavity vent 434 from the pressure sensing cavity 214 to the environment 234 outside the pressure sensing cavity 214, air may escape through the cavity vent 434 as the deformable solid 104 is forced into the pressure sensing cavity 214. Allowing air to escape out the cavity vent 434 prevents problematic air bubbles from lodging at or above the pressure sensing diaphragm 216 can causing unreliable pressure readings.

Many modifications and other embodiments of the invention set forth herein will come to mind to one skilled in the art to which these inventions pertain having the benefit of teachings presented in the foregoing descriptions and the associated drawings. Although the figures only show certain components of the apparatus described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, although specific terms are employed herein, they are used in a generic and descriptive sense only and not for purposes of limitation. For example, while primarily described as a media-isolated pressure sensor, a person of ordinary skill in the art will recognize that a media-isolated pressure sensor as described above may also measure a force applied to the coupling mechanism and other forces resulting from the measured media interacting with the coupling mechanism.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A media-isolated pressure sensor, the media-isolated pressure sensor comprising:

a pressure sensing diaphragm that is coupled to a substrate of the media-isolated pressure sensor;

a deformable solid, wherein the deformable solid is configured to deform so as to substantially cover a sensing surface of the pressure sensing diaphragm to create a barrier between the pressure sensing diaphragm and a measured media; and a ring seal assembly protruding from the substrate and defining a pressure sensing cavity wherein the ring seal assembly extends from the substrate beyond the furthest extent of the pressure sensing diaphragm and forms an enclosed perimeter around a pressure sensing die, and wherein the deformable solid fluidly couples the measured media to the pressure sensing diaphragm such that in an instance in which a force is applied to the deformable solid by the measured media the force is transmitted to the pressure sensing diaphragm.

2. The media-isolated pressure sensor of claim 1, further comprising, a pressure sensing die electrically connected to the pressure sensing diaphragm.

3. The media-isolated pressure sensor of claim 2, wherein the pressure sensing diaphragm is disposed on the pressure sensing die opposite the substrate.

4. The media-isolated pressure sensor of claim 3, wherein the pressure sensing die indicates a magnitude of the force applied by the measured media based on the deflection of the pressure sensing diaphragm.

5. The media-isolated pressure sensor of claim 4, wherein the pressure sensing diaphragm further comprises piezoresistive sensors arranged in a Wheatstone bridge circuit and the magnitude of the force applied by the measured media is determined based on one or more output signals of the Wheatstone bridge circuit.

6. The media-isolated pressure sensor of claim 3, wherein the ring seal assembly comprises an inner perimeter and an outer perimeter, and wherein the inner perimeter is circular.

7. The media-isolated pressure sensor of claim 6, wherein a maximum cross-sectional diameter of the deformable solid is greater than or equal to a diameter of the inner perimeter of the ring seal assembly.

8. The media-isolated pressure sensor of claim 1, wherein the deformable solid further deforms to substantially fill the pressure sensing cavity.

9. The media-isolated pressure sensor of claim 1, wherein the pressure sensing diaphragm is fluidly isolated from the measured media.

10. The media-isolated pressure sensor of claim 1, wherein the deformable solid is manufactured free of defects which change the fluid coupling properties over time.

11. The media-isolated pressure sensor of claim 1, wherein the measured media is a fluid.

12. A media-isolated pressure sensor, comprising:

pressure sensing circuitry that is attached to a substrate of the media-isolated pressure sensor and comprising a pressure sensing diaphragm disposed on a pressure sensing die, a ring seal assembly protruding from the substrate and defining a pressure sensing cavity, wherein the ring seal assembly extends from the substrate beyond the furthest extent of the pressure sensing diaphragm and forms an enclosed perimeter around the pressure sensing die, and a coupling mechanism comprising a deformable solid that deforms to cover a sensing surface of the pressure sensing diaphragm, wherein the deformable solid fluidly couples a measured media to the pressure sensing diaphragm such that in an instance when a force is applied to the deformable solid by the measured media the force is transmitted to the pressure sensing diaphragm.

13. The media-isolated pressure sensor of claim 12, further comprising a vent in the substrate, fluidly connecting the pressure sensing cavity with an environment opposite the surface of the pressure sensing cavity.

14. The media-isolated pressure sensor of claim 12, wherein the substrate is a printed circuit board.

15. The media-isolated pressure sensor of claim 12, wherein the pressure sensing die is electrically connected to the printed circuit board using one or more through-hole connections.

16. The media-isolated pressure sensor of claim 15, wherein at least one of the one or more through-hole connections fluidly connects the pressure sensing cavity with an environment opposite the substrate of the pressure sensing cavity.

17. The media-isolated pressure sensor of claim 12, wherein the pressure sensing die indicates a magnitude of the force applied by the measured media based at least in part on the deflection of the pressure sensing diaphragm.

18. The media-isolated pressure sensor of claim 12, wherein the pressure sensing diaphragm further comprises piezoresistive sensors arranged in a Wheatstone bridge circuit and a magnitude of the force applied by the measured media is determined based on one or more output signals of the Wheatstone bridge circuit.

\* \* \* \* \*